United States Patent [19]

Ohmura et al.

[11] 4,411,103
[45] Oct. 25, 1983

[54] CONSTRUCTION OF A DOOR BEAM OF A MOTOR VEHICLE

[75] Inventors: Eiichi Ohmura; Tateo Kitano, both of Toyota, Japan

[73] Assignee: Toyota Jidosha Kogyo Kabushiki Kaisha, Toyota, Japan

[21] Appl. No.: 264,560

[22] Filed: May 18, 1981

[30] Foreign Application Priority Data

May 29, 1980 [JP] Japan .................. 55-71989

[51] Int. Cl.³ .................. B60J 5/04; E06B 3/00
[52] U.S. Cl. .................. 49/502; 49/503
[58] Field of Search .................. 49/502, 503; 296/146, 296/188, 189

[56] References Cited

U.S. PATENT DOCUMENTS

| | | | |
|---|---|---|---|
| 3,907,358 | 9/1975 | Barenyi et al. | 49/502 X |
| 4,090,734 | 5/1978 | Inami et al. | 296/146 |
| 4,300,315 | 11/1981 | Holzwarth | 49/502 X |
| 4,306,381 | 12/1981 | Presto | 49/502 |

FOREIGN PATENT DOCUMENTS

| | | | |
|---|---|---|---|
| 2215674 | 5/1973 | Fed. Rep. of Germany | 49/502 |
| 1437575 | 5/1976 | United Kingdom | 502/ |

*Primary Examiner*—Philip C. Kannan
*Attorney, Agent, or Firm*—Parkhurst & Oliff

[57] ABSTRACT

A door beam of a motor vehicle is provided in a vehicle door. Section modulus of the door beam is progressively decreased from a center section toward opposite ends of the door beam and the contour of cross-section of the door beam is of a continuously formed round wave shape, whereby the door beam absorbs an impact of a collision by virtue of imparting the force of the impact to both bending and tensile forces so that the bending moment acting on the center of the door beam decreases.

9 Claims, 8 Drawing Figures

4,411,103

CONSTRUCTION OF A DOOR BEAM OF A MOTOR VEHICLE

BACKGROUND OF THE INVENTION

1. Field of the Invention

The present invention relates to a construction of a door beam of a motor vehicle, and particularly to a door beam of a motor vehicle provided in a vehicle door and fixed at opposite ends thereof to door side panels.

2. Description of the Prior Art

To prevent a vehicle door from being distorted due to a side collision of a motor vehicle so as to secure an occupant in safety, a door beam, in general, has been provided in the door to increase the rigidity of the door.

The door beam of the prior art is of such an arrangement that a section modulus for the beam is determined in consideration of a buckling strength of the section at the center of the door beam for bearing the maximum bending moment acting thereon through the total longitudinal length of the door beam, and the door beam has, over the total length thereof, the contour of the section substantially corresponding to the aforesaid section modulus. However, in the door beam of the prior art as described above, since the section over the total longitudinal length thereof is set up based on the section modulus bearable of the maximum bending moment, the section moduluses at opposite sides from the center of the door beam become unnecessarily large. Therefore, the door beam is increased in weight to an unnecessary extent and it becomes difficult dimension-wise to be disposed within a small space defined by a window pane and a door inner or outer panel in the door. Furthermore, in the door beam of the prior art as described above, since the maximum bending moment acting on the door beam increases in proportion to the total longitudinal length of the door beam, the maximum bending moment acting on the center of the door beam, in case of a long door in the longiutdinal direction, is increased in value, thus presenting disadvantageous conditions in weight and dimensions.

Furthermore, as with the door beam of the prior art, where it is impossible to increase the sectional area for increasing the section modulus due to the restriction in the space for providing the door beam in the door, there have been adopted a construction having a closed type section or a clad type section by adding a reinforcing beam at the center or over the total longitudinal length of the door beam. In that case, however, the door beam becomes complex in construction and the weight thereof increases. Furthermore, as in a door beam 1 shown in FIG. 1 as another example of the door beam of the prior art, in which the door beam has a cross-section of angular wave shape to increase the section modulus, a drawing width B against a unit drawing depth D becomes large due to a restriction in the work of deep drawing into the angular wave shape, whereby the total height H becomes large. As a result, the door beam becomes heavy in weight and the space required for providing the door beam becomes large.

SUMMARY OF THE INVENTION

The present invention has been developed to obviate the above disadvantages and has as its object the provision of a door beam of a motor vehicle being compact in size, light in weight and having a satisfactory distortion resisting function against a side collision of the motor vehicle.

To achieve the abovedescribed object, according to the present invention, in a door beam of a motor vehicle provided in a vehicle door and fixed at opposite ends thereof to door side panels, the section modulus thereof progressively decreases from the center toward the opposite ends thereof and the contour of the section thereof is of a round wave shape.

DESCRIPTION OF THE PREFERRED EMBODIMENT

Figure 1:
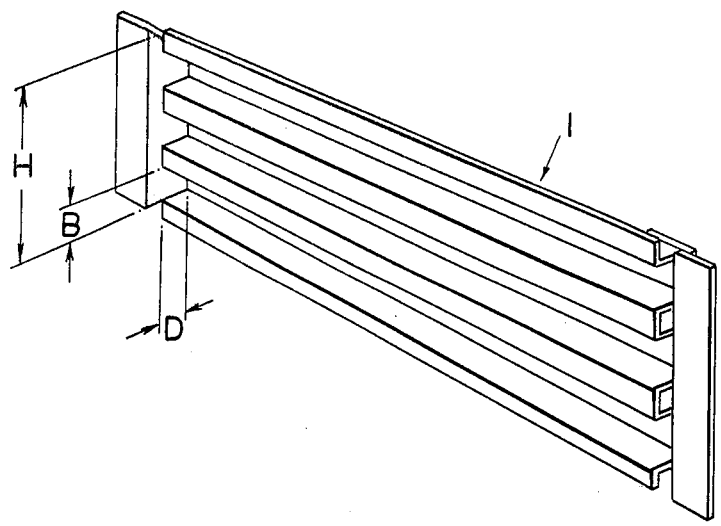
FIG. 1 is a perspective view showing an example of the door beam of a motor vehicle of the prior art.

Description will hereunder be given of an embodiment of the present invention with reference to the drawing.

Figure 2:
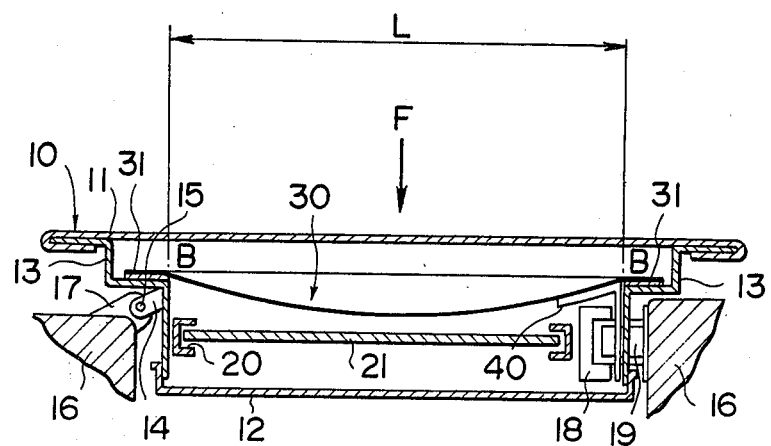
FIG. 2 is a sectional view showing the vehicle door which includes one embodiment of the door beam according to the present invention.

FIG. 2 is an explanatory view showing an embodiment of the door beam of a motor vehicle according to the present invention. A vehicle door 10 has an outer shell including a door outer panel 11, a door inner panel 12 and door side panels 13. One of the door side panels 13 of the door 10 is provided thereon with a male hinge member 14, which is relatively rotatably connected through a pin 15 to a female hinge member 17 provided on a vehicle body 16. The other of the door side panels 13 of the door 10 is provided thereon with a door lock 18, which is engageable with a striker 19 provided on the vehicle body 16 when the door 10 is closed. A pair of slide rails 20 are provided on opposing inner sides of the door 10 to vertically movably support a window pane 21 in the vertical direction.

A door beam 30 is provided in an inner space defined by the window pane 21 and the door outer panel 11 of the door in a manner to be fixed at mount portions 31 formed at opposite end thereof onto the door side panels 13 by welding. The door beam 30 in a plan view is of a circularly arcuate shape at the intermediate portion thereof except the mount portions 31 formed at the opposite ends thereof, and the section modulus is progressively decreased from the center section towards the opposite ends thereof.

Figure 3:
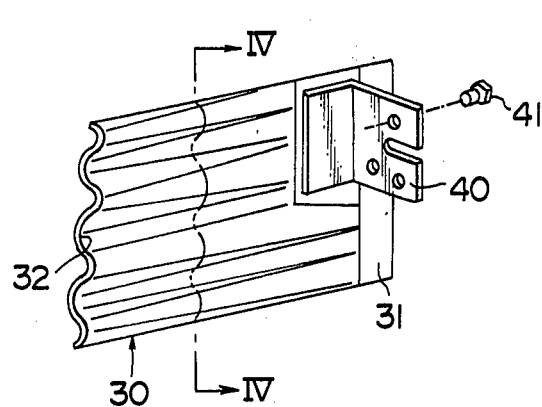
FIG. 3 is a perspective view showing a part of the door beam according to the present invention.
Figure 4:
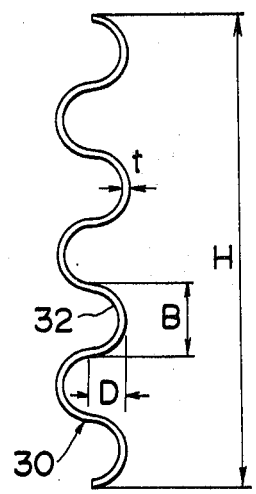
FIG. 4 is a sectional view taken along the line IV—IV in FIG. 3.

The door beam 30 in a cross-sectional view is of a round wave shape with round portions 32 being consecutively formed in the vertical direction, as shown in FIGS 3 and 4. More specifically, the door beam 30 is formed by a continuous curved line consisting of round portions 32, in which a drawing width B against a unit drawing depth D can be decreased while the plate thickness t is held at a predetermined value, whereby the center section of the door beam has a large section modulus in a condition where the total height H is set at a small value.

Further, fixed by welding to the other end of the door beam 30 is one of the surfaces of a substantially L-shaped lock reinforcement 40, the other of the surfaces of which is fastened together with the door lock 18 by means of screws 41.

Figure 5A:
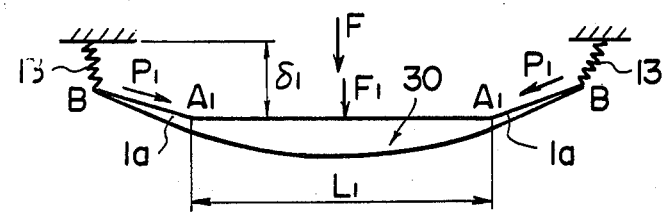
FIGS. 5A, 5B and 5C are schematic diagrams showing the deformed conditions of the door beam according to the present invention.

Description will now be given of operation of the abovedescribed embodiment. If an external force due to a side collision as indicated by arrow F in FIG. 2 acts on the door 10, in which the door lock 18 is perfectly engaged with the striker 19, then, as shown in FIG. 5A, the door side panels 13 with comparatively low rigidity buckle, and the opposite end portions A, whose sections are smaller than that of the center in the door beam 30 start deforming under bending (The portions A, indicate the hypothetical mean points of the portions subjected to the bending moment). Here, deformations under bending occur at the portions $A_1$ in the door beam 30, and each tensile force $P_1$ is generated in a region $1a$ between the portion $A_1$ and a fulcrum B. Consequently, the external force F forms the tensile forces $P_1$ by its part, applies a bending force $F_1$ to the door beam 30 and generates a deflection $\delta_1$ in the door beam 30.

Figure 5B:
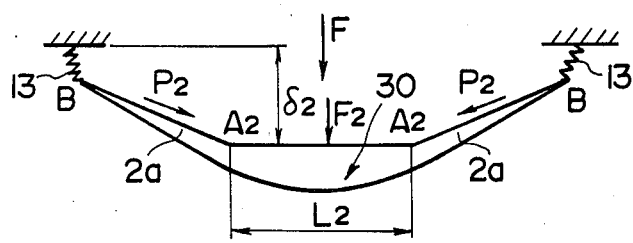

Since the sectional area of the door beam 30 in plan view is progressively increased from the opposite ends toward the center thereof, as the external force F acting on the door beam 30 increases, the portions subjected to deformation under bending move from the portions $A_1$ toward portions $A_2$ disposed more close to the center as shown in FIG. 5B, and tensile forces $P_2$ act on regions $2a$ between the portions $A_2$ and the fulcrums B in the increasing condition. More specifically, the external force F acts on the portions $A_2$ as a bending force $F_2$, applies the tensile forces $P_2$ to the regions $2a$ and generates a deflection $\delta_2$ in the door beam 30.

Figure 5C:
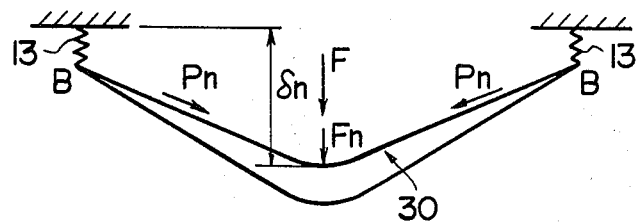

As the external force F acting on the door beam 30 progressively increases as described above, the portions of deformation under bending of the door beam 30 progressively move toward the center, and finally, the deformation under bending occurs at the center of the door beam 30 to reach buckling as shown in FIG. 5C. At this stage, the external force F acts on the center of the door beam 30 as a bending force $F_n$, applies tensile forces $P_n$ to the regions between the center and the fulcrums B, and generates a deflection $\delta_n$ in the door beam 30.

Figure 6:
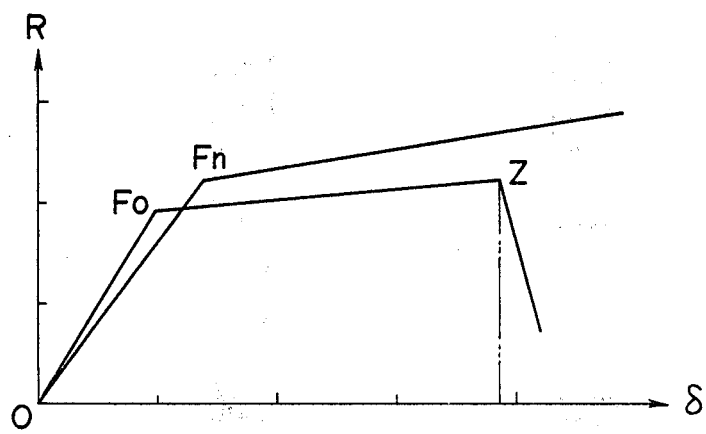
FIG. 6 is a graphic chart showing the relationship between the value δ of displacement of the door beam and the distortion resisting force R thereof.

As described above, deformations under bending of the door beam 30 progressively move from the fulcrums B disposed at the opposite ends toward the center through portions $A_1$ and $A_2$, the bending force acting on the door beam 30 is derived from the external force F and part of the bending moment acting on the center is replaced with the tensile forces, whereby the external force F is changed from F through $F_1$, $F_2$ ... to $F_n$. Consequently, the bending moment acting on the center of the door beam 30 progressively decreases from $M=(F \cdot L)/4$ through $M_1=(F_1 \cdot L_1)/4$ to $M_2=(F_2 \cdot L_2)/4$ . . . In other words, even where the section modulus at the center of the door beam 30 is small as compared with the section modulus of the door beam having a uniform value over the total length as in the prior art, a load $F_n$ generating buckling at the center of the door beam 30 becomes larger in value than a buckling load $F_0$ in the door beam of the prior art, as shown in FIG. 6.

As the external force F further acts on the door beam 30, in which a buckling has occurred at the center thereof as described above, the door beam 30, as the tensile forces increase therein, keeps its distortion resistance increased substantially rectilinearly.

Description will hereunder be given of operation of the lock reinforcement 40 during process of distortion of the door beam 30 as described above. In case progressively increasing tensile forces act on within the conventional door beam, in which a buckling has occurred at the center thereof, the door side panels are finally broken down at a point Z shown in FIG. 6, and one of the door side panels is detached from the door lock being engaged with the striker, whereby the door abruptly loses the resistance against the external force. In contrast with this, in the abovedescribed embodiment, since the door beam 30 and the door lock 18 are firmly connected to each other through the lock reinforcement 40, even if high tensile forces act on the door beam 30, the door beam 30 is never detached from the vehicle body 16 owing to the perfect connection of the door lock 18 to the striker 19 irrespective of the mechanical strength of the door side panels 13. More specifically, the door beam 30 having the lock reinforcement 40 secures a satisfactory mechanical strength against the tensile forces, can secure a satisfactory distortion resisting force in a region of high deflecting deformation even after the buckling has occurred at the center thereof.

In the abovedescribed embodiment, the door beam 30 is adapted to absorb an impact energy of the external force F due to a side collision by virtue of both the bending and tensile forces, which are progressively generated from the opposite ends to the center thereof. As a result, the contour of the section of the center thereof can be rendered small, a small space for provision within the door 10 can be effectively utilized and the door beam itself can be rendered light in weight. although the maximum bending moment generated at the center of the door beam 30 is proportional to the total length of the door 10, the bending moment acting on the center of the door beam 30 can be decreased, so that a necessary distortion resisting function can be secured by the use of the door beam 30, which is compact in size and light in weight, even in a motor vehicle having the long door 10. Further, since the door beam 30 is connected to the door lock 18 through the lock reinforcement 40, a satisfactory distortion resisting force can be secured in the region of high deflecting deformation even after the buckling has occurred at the center of the door beam 30, thereby enabling the device to reliably protect the occupant.

As has been described hereinabove, according to the present invention, in a door beam of a motor veehicle provided in a door and fixed at opposite ends thereof to door side panels, the section modulus thereof is progressivly decreased from the section at the center toward the opposite ends thereof and the contour of cross-section thereof is of a round wave shape, so that such advantage can be offered that the door beam, while being compact in size and light in weight, displays a satisfactory distortion resisting function.

What is claimed is:
1. A vehicle door construction having a pair of side panels comprising:
    a door beam fixed to the door side panels at opposite ends of said door beam, said door beam being of an arcuate shape in plan view, said door beam being further configured such that the section modulus of said door beam is a maximum at a center section of said door beam and gradually decreases toward both opposite ends of said door beam, the contour of cross section of said door beam being of round wave shape.

2. A vehicle door construction as in claim 1, wherein the door is further provided with inner and outer panels, and wherein the door beam is fixed between the inner and outer panels.

3. A vehicle door construction as in claim 2, wherein said door beam in a cross-sectional view is of a round wave shape with round portions being consecutively formed in the vertical direction.

4. A vehicle door construction as in claim 2, wherein said door beam in a plan view is of a circularly arcuate shape at the intermediate portion thereof except at the opposite ends thereof.

5. A vehicle door construction as in claim 4, wherein said circularly arcuate shape is provided at an inner surface of said door beam and an outer surface thereof is formed into a flat shape.

6. A vehicle door construction as in claim 2, further comprising a lock reinforcement to reinforce a connection between said door beam and a door lock mechanism provided at one of said door side panels.

7. A vehicle door construction as in claim 6, wherein said lock reinforcement is substantially L-shaped, one side of an outer surface of said lock reinforcement being fixed to the surface of said door beam and the other side of the outer surface of said lock reinforcement being securely fastened with said door lock mechanism.

8. Door beam construction for a motor vehicle comprising:
a vehicle door having side panels therein;
a door beam provided in said vehicle door and fixed at opposite ends thereof to said door side panels of said vehicle door, said door beam being of circularly arcuate shape at the intermediate portion thereof and of a round wave shape with round portions being consecutively formed in the vertical direction in a cross-sectional view, the section modulus of said door beam being gradually and progressively decreased from a center section toward opposite ends thereof such that the said section modulus is a maximum at a center section of said door beam;
a door lock mechanism provided at one of said door side panels to lock said vehicle door to a vehicle body; and
a substantially L-shaped lock reinforcement to reinforce a connection between said door beam and said door lock mechanism, one side of an outer surface of said lock reinforcement being fixed to a surface of said door beam and the other side of the outer surface of said lock reinforcement being securely fastened with said door lock mechanism.

9. A vehicle door construction as in claim 8, wherein the door is further provided with inner and outer panels, and wherein the door beam is fixed between the inner and outer panels.

* * * * *